United States Patent
Tesanovic et al.

(10) Patent No.: US 9,559,923 B2
(45) Date of Patent: Jan. 31, 2017

(54) ADAPTIVE BUFFER STATUS REPORTING

(75) Inventors: Milos Tesanovic, Cambridge (GB); Matthew Baker, Canterbury (GB)

(73) Assignee: Koninklijke Philips N.V., Eindhoven (NL)

( * ) Notice: Subject to any disclaimer, the term of this patent is extended or adjusted under 35 U.S.C. 154(b) by 393 days.

(21) Appl. No.: 13/264,611

(22) PCT Filed: Apr. 12, 2010

(86) PCT No.: PCT/IB2010/051566
§ 371 (c)(1),
(2), (4) Date: Oct. 14, 2011

(87) PCT Pub. No.: WO2010/119390
PCT Pub. Date: Oct. 21, 2010

(65) Prior Publication Data
US 2012/0033569 A1 Feb. 9, 2012

(30) Foreign Application Priority Data
Apr. 16, 2009 (EP) ..................................... 09305324

(51) Int. Cl.
*H04L 12/26* (2006.01)
*H04L 12/835* (2013.01)
(Continued)

(52) U.S. Cl.
CPC ...... *H04L 43/0817* (2013.01); *H04W 28/0278* (2013.01); *H04L 47/30* (2013.01); *H04W 72/1284* (2013.01)

(58) Field of Classification Search
CPC .................... H04W 28/0273; H04W 28/0278; H04W 72/1284; H04W 72/1289; H04W 28/12; H04W 28/14; H04W 24/10; H04L 47/30; H04L 43/0817
See application file for complete search history.

(56) References Cited

U.S. PATENT DOCUMENTS

2008/0081628 A1* 4/2008 Ye et al. ........................ 455/445
2009/0080380 A1 3/2009 Chun et al.
(Continued)

FOREIGN PATENT DOCUMENTS

CA 2678664 A1 9/2008
EP 1909442 A2 4/2008
(Continued)

OTHER PUBLICATIONS

3GPP TS 36.321 V8.5.0. Technical Specification—"3rd Generation Partnership Project; Technical Specification Group Radio Access Network; Evolved Universal Terrestrial Radio Access (E-UTRA) Medium Access Control (MAC) Protocol Specification (Release 8)"; 46 page Document.

(Continued)

*Primary Examiner* — Yemane Mesfin
*Assistant Examiner* — Peter Chen

(57) ABSTRACT

The present invention relates to a method for communicating in a network from a first station to a second station, wherein the first station comprises at least one buffer memory for storing data packets to be transmitted, the method comprising the steps of (a) the first station estimating the status of the at least one buffer memory, (b) the first station transmitting at least one buffer status packet representative of the buffer memory status, wherein the method further comprises (c) adapting the value of a first parameter of the buffer status packets on the basis of a data traffic characteristic.

18 Claims, 2 Drawing Sheets

| BSR | LCG#1 | BSR | LCG#2 | BSR | LCG#3 | BSR | LCG#4 |

| LCG#2 ID | BSR | LCG#1 | BSR | LCG#3 | BSR | LCG#4 |

(51) Int. Cl.
*H04W 28/02* (2009.01)
*H04W 72/12* (2009.01)

(56) References Cited

U.S. PATENT DOCUMENTS

2009/0113086 A1* 4/2009 Wu et al. .................. 710/56
2010/0085926 A1   4/2010 Harada et al.
2010/0254321 A1* 10/2010 Kim et al. ................ 370/329
2011/0235512 A1*  9/2011 Yuki ........................ 370/230.1
2011/0292901 A1* 12/2011 Pettersson et al. ........ 370/329
2012/0044880 A1*  2/2012 Sun et al. ................. 370/329

FOREIGN PATENT DOCUMENTS

| EP | 2026617 A1 | 2/2009 |
|----|-----------|--------|
| WO | 2007147431 A1 | 12/2007 |
| WO | 2008060077 A1 | 5/2008 |
| WO | 2008156198 A2 | 12/2008 |
| WO | 2009038377 A2 | 3/2009 |

OTHER PUBLICATIONS

Ericsson, "Mac Happy Bits for UL", 3GPP TSG-RAN WG2 #59BIS, TD R2-074059, Shanghai, CN, Oct. 2007, p. 1-6.

Ericcson, "Sceduling Request Triggering Criteriouns for LTE", R2-074048, 3GPP TSG-RAN WG2 #59BIS, Shanghai, China, Oct. 2007, p. 1-4.

Ericsson, "Mac Header Structure", R2-074062, 3GPP TSG-RAN WG2 #59BIS, Shanghi, China, Oct. 2007, p. 1-5.

* cited by examiner

| 201 | | 201 | | 201 | | 301 | | 301 | |
|---|---|---|---|---|---|---|---|---|---|

| 202 | | | 202 | 302 | | 302 | | 302 |
|---|---|---|---|---|---|---|---|---|

| BSR | LCG#1 | BSR | LCG#2 | BSR | LCG#3 | BSR | LCG#4 |
|---|---|---|---|---|---|---|---|

FIG. 3A

| LCG #2 ID | BSR | LCG#1 | BSR | LCG#3 | BSR | LCG#4 |
|---|---|---|---|---|---|---|

FIG. 3B

| LCG #1 ID | BSR | LCG#1 | LCG #2 ID | BSR | LCG#4 |
|---|---|---|---|---|---|

FIG. 3C

ADAPTIVE BUFFER STATUS REPORTING

FIELD OF THE INVENTION

The present invention relates to a method for communicating in a communication network. More specifically, it relates to a method for communicating from a first station and a second station. It also relates to radio stations able to implement such a method.

This invention is, for example, relevant for all wireless communication networks, and in an example of the following description, for a mobile telecommunication network as UMTS, or UMTS LTE.

BACKGROUND OF THE INVENTION

In a cellular network, each cell comprises a primary radio station, like a base station, or a Node B, or an eNB communicating with a plurality of secondary stations, like mobile stations, or User Equipments. To be able to send data to the primary station on some uplink channels, a secondary station must typically have an allocated resource (e.g. time slot, frequency subcarrier, and/or code).

Many communication systems operate using a centralised scheduler which is responsible for allocating transmission resources to different nodes. A typical example is the uplink of the UMTS LTE (Long Term Evolution), where the uplink transmissions from different secondary stations are scheduled in time and frequency by the primary station. The primary station transmits a "scheduling grant" message to a secondary station, indicating a particular time-frequency resource for the secondary station's transmission, typically around 3 ms after the transmission of the grant message. The grant message also typically specifies transmission parameters as the data rate and/or power to be used for the secondary station transmission.

In order for the primary station to issue appropriate grants, it needs to have sufficient information about the amount and type of data awaiting transmission in the buffer of each secondary station.

In LTE, several types of buffer status report (BSR) messages are therefore defined, which may be transmitted from a secondary station to the primary station when certain triggers occur. The current version of 3GPP TS36.321 is incorporated by reference.

The Buffer Status reporting procedure is used to provide the serving primary station with information about the amount of data in the uplink buffers of the secondary station. Two kinds of Buffer Status Reports are used depending on the events. A short Buffer Status Report (BSR) comprises the identity of a single group of logical channels, together with a 6-bit indicator of the amount of data corresponding to that group of logical channels currently residing in the secondary station buffer awaiting transmission. A long BSR comprises four concatenated short BSRs, each corresponding to a different group of logical channels.

A problem with the BSR procedure defined above is that a secondary station is only permitted to transmit a BSR if it has a granted resource in which to transmit. If new data arrives in a secondary station's buffer and the secondary station has no granted resource in which to transmit the data or to send a BSR to indicate that it has data awaiting transmission, the secondary station must either wait until a grant is received, or transmit a simpler version of the BSR which can be transmitted using some specially-designated resources which can be used without a specific granted resource. This simpler version of the BSR is known as a "scheduling request" (SR), and typically comprises only a single bit to indicate that data is in the buffer. It is also known for an SR to comprise a small plurality of bits, which gives greater functionality. In response to receiving an SR, a primary station may either transmit a grant allocating a suitable amount of transmission resource for the secondary station then to send a BSR, or transmit a grant allocating a larger amount of transmission resource which would enable the secondary station to transmit some data in addition to the BSR; however, in the latter case there is typically no means for the primary station to determine a suitable size of allocation to make, unless the SR comprises more than a single bit.

As a consequence, the known implementations for informing the primary station of the status of the secondary station's buffers do not make it possible to have an adequate amount of information. Indeed, in cases of low activity of the secondary station, the BSR transmitted regularly are more than sufficient, and do not use the resources in an efficient manner. On the contrary, in case of high activity of the secondary station, the BSRs may not give sufficient information of the real state of the secondary station's buffers.

SUMMARY OF THE INVENTION

It is an object of the invention to propose an improved method for communicating in a network which alleviates the above described problems.

It is another object of the invention to propose a method for communicating the status of the buffers of the mobile station in an efficient manner, making an efficient use of the resources.

Still another object of the invention is to propose a method for signaling the status of buffer memories in a manner adapted to the situation of the secondary station.

In accordance with a first aspect of the invention, a method is proposed for communicating in a network from a first station to a second station, wherein the first station comprises at least one buffer memory for storing data packets to be transmitted, the method comprising the steps of (a) the first station estimating the status of the at least one buffer memory, (b) the first station transmitting at least one buffer status packet representative of the buffer memory status, wherein the method further comprises (c) adapting the value of a first parameter of the buffer status packets on the basis of a data traffic characteristic.

In exemplary embodiments, the first station is a secondary station (or a User Equipment, or a Mobile Station) and the second station is a primary station (or a eNodeB, a Base Station).

In accordance with another aspect of the invention, it is proposed a radio station comprising means for communicating in a network with at least a further station, the first station further comprising at least one buffer memory for storing data packets to be transmitted, buffer control means for estimating the status of the at least one buffer memory, transmitting means for transmitting at least one buffer status packet representative of the buffer memory status, wherein the buffer control means are arranged for adjusting the value of a first parameter of the buffer status packets on the basis of a data traffic characteristic.

Thanks to these features, the radio station, like the secondary station, is able to adapt the amount of information transmitted to the second station, like the primary station, in dependence with the situation of the secondary station or of the overall occupancy of the network. Thus, this permits to make an efficient use of the resources granted to the secondary stations for signaling the status of the buffer memory.

Moreover, it is to be noted that in the variant of the invention where the secondary stations communicate on a plurality of logical channels, their buffer memories may comprise a plurality of logical channel buffers, whose status is signaled independently one from another, and that the adaptation of step (c) can be made on one or more of the logical channel status reports. Thus, the logical channel status reports dedicated to a logical channel with low activity may be signaled less frequently or with low accuracy so that the logical channel status reports dedicated to a logical channel with high activity can be signaled more frequently or with a higher accuracy (e.g. coded on more bits).

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIGS. 2A and 2B are time charts showing the adaptation of the signaling in accordance with a first embodiment.

FIGS. 3A, 3B and 3C are time charts showing variant of the first embodiment.

DETAILED DESCRIPTION OF THE INVENTION

Figure 1:
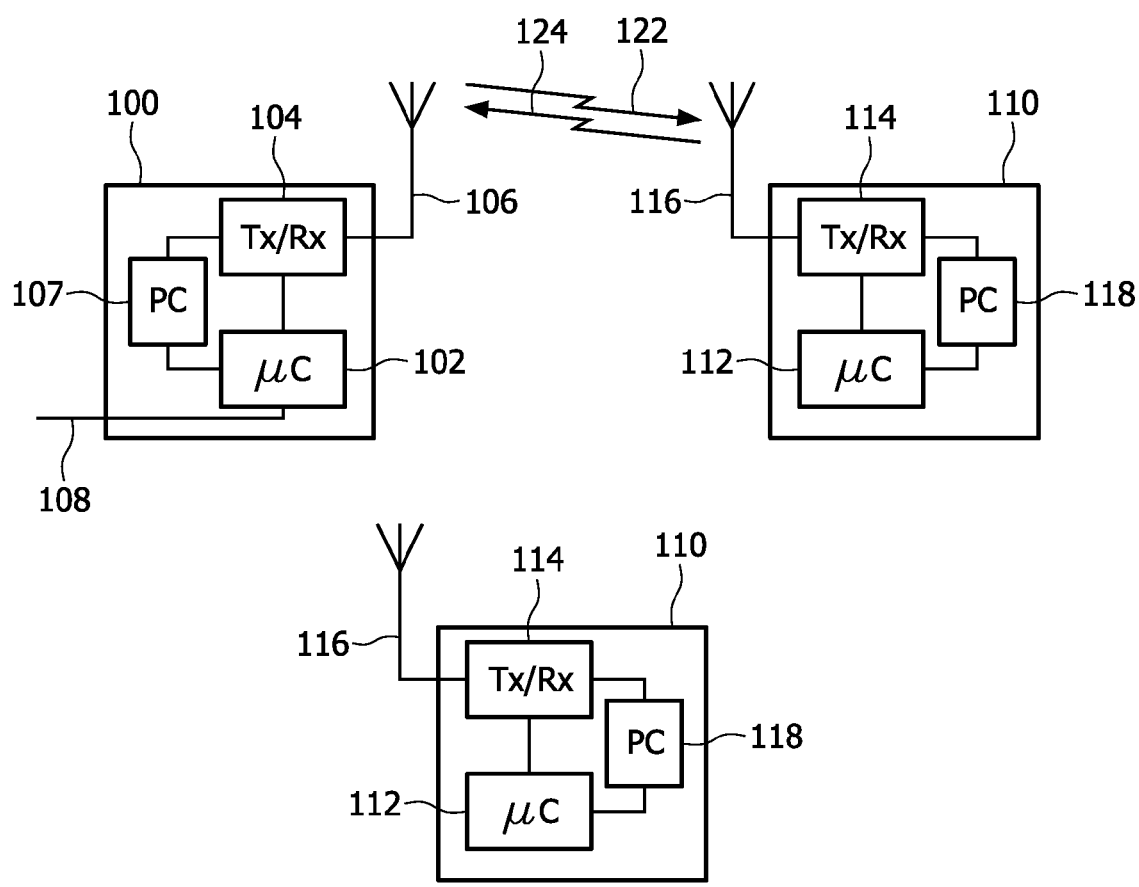
FIG. 1 is a block diagram of a network where the invention is implemented.

The present invention relates to a communication network having a primary station and a plurality of secondary stations communicating with the primary station. Such a network is illustrated on FIG. 1.

Referring to FIG. 1, a radio communication system in accordance with the invention comprises a primary radio station (BS) 100 and a plurality of secondary radio stations (MS) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each secondary station 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on a downlink channel, while communication from secondary station 110 to primary station 100 takes place on an uplink channel.

In wireless packet-data networks with centralised control like the network of FIG. 1, a mechanism is required to enable the primary station 100 (or eNB in UMTS LTE terminology) to prioritise effectively the allocation of uplink transmission resources between different secondary stations 110 (user equipment, or UEs, in UMTS LTE). Each secondary station typically has data queued in buffers until it can transmit; there may be buffers for a number of different streams, or logical channels (LCs), each with a different quality of service (QoS) requirement. The primary station needs information to enable it to decide which secondary statons should be granted to transmit, and at what rate. To assist in this process and reduce overhead, it is possible to group LCs into LC groups (LCGs) and transmit the indication of the buffered data for different LCGs (namely buffer status reports, BSRs).

As explained above, in such systems, such as UMTS LTE, the number of bits allocated to BSRs is usually predetermined and equal for all LCGs. Furthermore, perfect buffer status knowledge at the primary station 100 is often assumed; in other words, the primary station has very finely quantised knowledge of the number of bytes in the secondary stations' buffers. Some simulation indicates that it may be more advantageous to send coarse buffer status updates more frequently, than more detailed reports spaced further apart, especially for real time functionalities. As a result, a fixed buffer Status Report (BSR) length designed to give accurate buffer status knowledge has the following disadvantages:

1. It incurs significant overhead, which may not be justified in the light of the fact that in some cases the same or similar performance can be achieved with fewer bits allocated to BSR.

2. It prevents BSRs for multiple LCGs being fed back to the primary station in cases where only a portion of the total number of bits required is available; in such cases, the current systems would only provide full BSR for the LCG of the highest priority. (An example of such a case occurs when the amount of data which can be transmitted is smaller than the granted transmission resources, with the result that some padding is necessary to fill the granted resources; in such a case some or all of the padding bits may be replaced by BSR signalling, but the number of such padding bits available to be replaced may be insufficient for full BSRs to be transmitted for all LCGs.).

The invention is based on the recognition that the BSRs need to be adapted to the situation of the data traffic of the whole network, of the particular secondary station, and/or of the group of logical channel corresponding to the BSR. In accordance with a first embodiment of the invention, a proposed solution is to allow configurable coarseness and/or frequency of the BSRs. As a consequence, in accordance with a first embodiment of the invention, it consists of queuing data units in the secondary station buffers, for estimating the level of BSR coarseness suitable for a particular scenario, either in the secondary station itself or in the primary station, and then adapting the coarseness of BSR signalling according to the estimate. An example of this embodiment is illustrated in FIG. 2A. In accordance with this example, the secondary station in a first phase 200 of operation transmits one BSR 201 dedicated to at least one logical channel regularly. After estimation of a data traffic characteristic causing the secondary station entering in a second phase 300, like a stricter QoS requirement for this logical channel, or higher activity, the secondary station transmits BSRs 301 with more accuracy, e.g. with more bits. As a consequence, in a given time, the amount of data transmitted dedicated to this logical channel is higher in the second phase 300 than in the first phase 200. Thus, the BSRs are adapted over the time.

In accordance with a variant of the first embodiment illustrated on FIG. 2B, the BSRs 302 in the second phase 300 are transmitted more frequently than the BSRs 202 of the first phase 200. The size of the BSRs is not be varied. As a consequence, as in the first example of FIG. 2B, over the time, the amount of data transmitted dedicated to this logical channel is higher in the second phase 300 than in the first phase 200. Thus, the BSRs are adapted over the time.

It is to be noted that these two examples may be combined, for instance where the BSRs are sent more frequently, and with a lower accuracy for instance.

In accordance with the first embodiment, the entry in the second phase is caused after the estimation of a certain characteristic of traffic profiles. Possible candidates include:

a. The traffic intensity, that can be defined by the average number of new arrivals into the system;

b. The overall system QoS requirements, such as the total number of satisfied users.

c. The type of traffic (e.g. VoIP or video or file transfer).

d. The amount of buffered data for one or more traffic flows.

This estimation can be done by the primary station 100, and can be done for each logical channel group. Then, the primary station may transmit the estimated characteristic value, and the secondary station deduces from the value the adequate BSR coarseness (by adapting the frequency, or the accuracy of the BSR), or even the BSR coarseness explicitly signalled for each LCG. This value may be different for different LCGs.

Prior to explicitly signalling the BSR coarseness for each LCG individually, the grouping of LCs into LCGs can be performed by the network (e.g. based on the similarity between BSR levels sufficient for satisfactory performance). In a variant of this invention, the BSR coarseness is estimated based on the number of padding bits available, or with consideration of the actual scheduling algorithm employed.

In a second embodiment of the invention, a table of satisfactory levels of BSR coarseness for a given QoS and a varying range of traffic loads can be produced for VoIP traffic. Depending on the actual traffic volume in the system, known to the primary station, the secondary station can then actively adapt the BSR coarseness based on the traffic load information from the primary station.

Another example is the case of padding BSR in UMTS Rel-8 (LTE). If there is more than one LCG with buffered data, and there are not enough bits to send a long BSR, a mechanism is devised according to this invention that determines which of the LCGs will have their BSRs sent, and not just the one with the highest priority. This decision can be based on:

1. Priorities: 2, 3, or 4 LCGs are selected that have the highest priority and not just the LCG with the highest priority;

2. Buffer level fills: in addition to priorities, thresholds can be introduced that, when exceeded, indicate that the LCG in question qualifies to have its BSR sent, or that adapt the granularity of the BSR.

3. Head-of-line delay (i.e. the length of time for which the oldest packet has been in the buffer).

Additionally, formats are proposed below that enable 2, 3 and 4 coarse BSRs to be combined into an octet. The BSR format being transmitted could be indicated by means of an LCID value, as in the first version of LTE. New LCID values would need to be reserved for these three formats on FIGS. 3A to 3C.

On FIG. 3A, if 4 LCGs are signaled to the primary station in one BSR: In this case, similar to long BSR, there is no need to indicate the LCGs' IDs, providing the corresponding BSRs are given in correct order (since only 4 LCGs are defined in LTE; in the general case, this format applies to the transmission of BSR information for all configured LCGs). In an embodiment in which 8 bits are available, this means that we have 2 bits for each of the 4 LCGs, as shown on FIG. 3A.

On FIG. 3B, if 3 LCGs are signaled to the primary station in one BSR: If we were to send the 3 2-bit IDs, in LTE we would be left with only 8-6=2 bits for three BSRs. An alternative is proposed below that reports the ID of the LCG whose BSR is not being reported (in this case LCG #2), followed by 3 2-bit BSRs in correct order.

On FIG. 3C, only 2 LCGs are signaled in one BSR, where the IDs of the two logical channel groups are signaled with the value of the buffer status of this LCG. For a 8-bit BSR, 2 bits are used for the ID, and 2 bits are used for the value of the buffer status of this LCG.

In another embodiment, the BSR length is set according to the traffic class. For example, a secondary station could transmit a long BSR for a LCG containing at least one data flow with a multi-level satisfaction criterion (e.g. an FTP download, where the degree of user satisfaction typically increases with reducing transfer delay), while the secondary station could transmit a shorter BSR for a LCG containing only data flows with a bistate satisfaction criterion (e.g. a VoIP service where the user is typically either satisfied or not depending on a certain proportion of the packets being successfully delivered within a fixed time period).

Another embodiment is the case where the frequency at which the BSR is sent is preconfigured. The secondary station could in that case adjust the length of the BSR to achieve required QoS in a way dependent on preconfigured frequency.

In cases where the estimation of suitable BSR length is performed at the base station, the base station then signals the result of the estimation to the UE. In a typical embodiment, the UE may therefore receive a list of logical channels, logical channel groups or priorities, with a corresponding associated BSR length for each.

In a variant of the invention, the primary station is a mobile terminal like a User Equipment, and the primary station is a base station like a eNodeB.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a secondary station for communicating in a network, with a primary station, the method comprising:

in the secondary station:

a controller of the secondary station estimating a status of a buffer memory for storing data packets including buffer status packets for transmission to the primary station, wherein the buffer memory comprises at least one logical channel buffer storing the data packets including the buffer status packets dedicated to information regarding a status of a logical group of logical channels;

the controller determining a buffer status packet representative of the buffer memory status, and the controller adjusting a value of a first parameter of the buffer status packet based on a data traffic characteristic, comprising adjusting the time interval between successive transmissions of at least one portion of the buffer status packet;

a transceiver of the secondary station transmitting the at least one portion of the buffer status packet to the primary station;

wherein the data traffic characteristic includes at least one of: a traffic intensity, a Quality of Service requirement, a total number of satisfied users, a type of traffic, an amount of buffered data for one or more traffic flows or logical channels, a status of the buffer memory, or a number of padding bits available in a data packet or any combination thereof; and wherein the controller selects a subset of logical channel buffers from among the at least one logical channel buffer based on at least one of: a priority of a logical channel, a head of line delay, a logical channel buffer fill level, or a number of padding bits available in a data packet or any combination thereof.

2. A secondary station for communication in a network, with a primary station, comprising:

a buffer memory for storing data packets including buffer status packets to be transmitted to a primary station, wherein the buffer memory comprises at least one logical channel buffer storing the data packets including the buffer status packets dedicated to information regarding a status of a logical group of logical channels;

a processor configured for:
  estimating a status of the buffer memory, and
  adjusting a value of a first parameter of at least one buffer status packet based on a data traffic characteristic, the adjusting comprising adjusting the time interval between successive transmissions of the at least one buffer status packet; and a transmitter configured for transmitting to the primary station the at least one buffer status packet representative of the buffer memory status, and wherein the data traffic characteristic includes at least one of: a traffic intensity, a Quality of Service requirement, a total number of satisfied users, a type of traffic, an amount of buffered data for one or more traffic flows or logical channels, a status of the buffer memory, or a number of padding bits available in a data packet or any combination thereof; and wherein the processor selects a subset of logical channel buffers from among the at least one logical channel buffer based on at least one of: a priority of a logical channel, a head of line delay, a logical channel buffer fill level, or a number of padding bits available in a data packet or any combination thereof.

3. The secondary station of claim 2, wherein adjusting the value of the first parameter of the at least one buffer status packet, based on the data traffic characteristic, comprises adjusting an amount of information transmitted in the at least one portion of the buffer status packet at a given time.

4. The secondary station of claim 2, wherein adjusting the value of the first parameter of the at least one buffer status packet, based on the data traffic characteristic, comprises adjusting a size of the at least one portion of the buffer status packet.

5. The secondary station of claim 2, wherein adjusting the value of the first parameter of the at least one buffer status packet, based on a data traffic characteristic, comprises adjusting a granularity of the information contained in the at least one portion of the buffer status packet.

6. The secondary station of claim 2, wherein the time intervals between successive transmissions to the primary station, of at least one portion of the buffer status packet, are equal.

7. The secondary station of claim 2, comprising:
a receiver configured to receive an estimated data traffic characteristic from the primary station, and
the processor configured to adjust the value of the first parameter of the buffer status packet based on the received data traffic characteristic.

8. The secondary station of claim 2, comprising:
the processor configured to control a receiver configured to receive a parameter value from the primary station, and
the processor adjusting the time interval between successive transmissions of at least one portion of the buffer status packet based on the received value of the parameter.

9. The secondary station of claim 2, wherein the first parameter of the buffer status packet indicates the time interval between successive transmissions of the at least one portion.

10. The secondary station of claim 2, wherein the buffer memory comprises:
a plurality of logical channel buffers, the plurality of logical channel buffers storing data packets dedicated to one of the group of: a logical channel; and a group of logical channels; wherein the at least one portion of the buffer status packet is dedicated to information regarding a status of a corresponding one of the logical channels or group of logical channels.

11. The secondary station of claim 2, comprising the processor:
logically grouping the logical channel buffers depending on having a same buffer status packet first parameter value.

12. The secondary station of claim 2, wherein:
the at least one buffer comprising logical channel buffers;
the processor is configured to select a subset of logical channel buffers, and
the transmitter is configured to transmit the at least one portion of the buffer status packet indicating a status of the selected logical channel buffers.

13. The secondary station of claim 2, wherein:
the at least one buffer comprising logical channel buffers;
the processor is configured to control a receiver that is configured to to receive from the primary station, a size of the subset of logical channel buffers.

14. A non-transitory computer readable medium having instructions stored thereon that when executed cause a processing circuitry of a secondary station to:
in the secondary station:
a controller of the secondary station estimating a status of a buffer memory for storing data packets including buffer status packets for transmission to a primary station, wherein the buffer memory comprises at least one logical channel buffer storing the data packets including the buffer status packets dedicated to information regarding a status of a logical group of logical channels, and the controller determining a buffer status packet representative of the status of the at least one logical buffer memory, and the controller adjusting a value of a first parameter of the buffer status packet based on a data traffic characteristic, the adjusting comprising adjusting the time interval between successive transmissions of the at least one buffer status packet; and a transceiver of the secondary station transmitting the at least one buffer status packet to the primary station; and wherein the data traffic characteristic includes at least one of: a traffic intensity, a Quality of Service requirement, a total number of satisfied users, a type of traffic, an amount of buffered data for one or more traffic flows or logical channels, a status of the buffer memory, or a number of padding bits available in a data packet or any combination thereof; and wherein the controller selects a subset of logical channel buffers from among the at least one logical channel buffer based on at least one of: a priority of a logical channel, a head of line delay, a logical channel buffer fill level, or a number of padding bits available in a data packet or any combination thereof.

15. A method for operating a primary station that communicates in a network, with a secondary station, the method comprising:

in the primary station:

a controller estimating a data traffic characteristic;

a transceiver of the primary station transmitting the estimated data traffic characteristic to the secondary station;

the transceiver of the primary station transmitting to the secondary station an indication of a number of logical channel buffers for which respective portions of buffer status packets associated with at least one logical channel buffer of the secondary station should be transmitted from the secondary station to the primary station, the at least one logical channel buffer of the secondary station for storing data packets including buffer status packets for transmission through respective logical channels to the primary station, wherein the buffer status packets are dedicated to information regarding a status of a logical group of logical channels;

wherein the number of logical channel buffers for selection by the secondary station are based on at least one of: a priority of a logical channel, a head of line delay, a logical channel buffer fill level, or a number of padding bits available in a data packet or any combination thereof;

the transceiver of the primary station receiving from the secondary station, a number of portions of buffer status packets that were indicated in the transmission to the secondary station, the portions of buffer status packets being representative of a status of respective logical channel buffer memories of the secondary station, a value of a first parameter of the buffer status packets being adjusted to adjust the time interval between successive transmissions of the buffer status packets based on the estimated data traffic characteristic; and the controller, controlling the transceiver to receive the buffer status packets separated by the time interval adjusted by the first parameter, and wherein the data traffic characteristic includes at least one of: a traffic intensity, a Quality of Service requirement, a total number of satisfied users, a type of traffic, an amount of buffered data for one or more traffic flows or logical channels, a status of the buffer memory, or a number of padding bits available in a data packet or any combination thereof.

16. A primary station for communication in a network, with a secondary station, comprising:

a controller configured to estimate a data traffic characteristic;

the controller configured to control a transmitter of the primary station, configured to transmit to the secondary station:

the estimated data traffic characteristic; and an indication of a number of logical channel buffers for which respective buffer status packets should be transmitted to the primary station, wherein the logical channel buffers are associated with corresponding portions of the buffer status packets, wherein the buffer status packets are dedicated to information regarding a status of a logical group of logical channels; and wherein the number of logical channel buffers for selection by the secondary station are based on at least one of: a priority of a logical channel, a head of line delay, a logical channel buffer fill level, or a number of padding bits available in a data packet or any combination thereof;

the controller configured to control a receiver of the primary station, configured to receive from the secondary station, the number of portions of the buffer status packets that were indicated, the portions of buffer status packets being representative of a status of respective logical channels buffer memories of the secondary station, the buffer status packets comprising a first parameter, a value of the first parameter of the buffer status packets having been adjusted to adjust the time interval between successive transmissions of the buffer status packets based on the estimated data traffic characteristic, and wherein the data traffic characteristic includes at least one of: a traffic intensity, a Quality of Service requirement, a total number of satisfied users, a type of traffic, an amount of buffered data for one or more traffic flows or logical channels, a status of the buffer memory, or a number of padding bits available in a data packet or any combination thereof.

17. The primary station of claim 16, comprising:

the controller controlling the transmitter configured for signaling to the secondary station a value of a parameter of the buffer status packet.

18. A non-transitory computer-readable storage medium having instructions stored thereon that when executed cause a processing circuitry of a primary station to:

in the primary station:

a controller:

estimating a data traffic characteristic;

transmitting, via a transmitter of the primary station, to a secondary station, the estimated data traffic characteristic;

transmitting, via the transmitter of the primary station, to the secondary station, an indication of a number of logical channel buffers for which respective portions of buffer status packets should be transmitted to the primary station, wherein the number of the logical channel buffers are associated with a corresponding portion of buffer status packets, wherein the number of logical channel buffers for selection by the secondary station are based on at least one of: a priority of a logical channel, a head of line delay, a logical channel buffer fill level, or a number of padding bits available in a data packet or any combination thereof;

receiving, via a receiver of the primary station, from the secondary station, the number of portions of buffer status packets that were indicated, the buffer status packets being representative of a status of respective logical channel buffer memories of the secondary station, the buffer status packets comprising a first parameter, wherein a value of the first parameter of the buffer status packets having been adjusted to adjust the time interval between successive transmissions of the buffer status packets based on the estimated data traffic characteristic, and wherein the data traffic characteristic includes at least one of: a traffic intensity, a Quality of Service requirement, a total number of satisfied users, a type of traffic, an amount of buffered data for one or more traffic flows or logical channels, a status of the buffer memory, or a number of padding bits available in a data packet or any combination thereof.

\* \* \* \* \*